April 28, 1970 A. W. VIENNA 3,508,514
CARGO SHIPS
Original Filed April 4, 1966 5 Sheets-Sheet 1
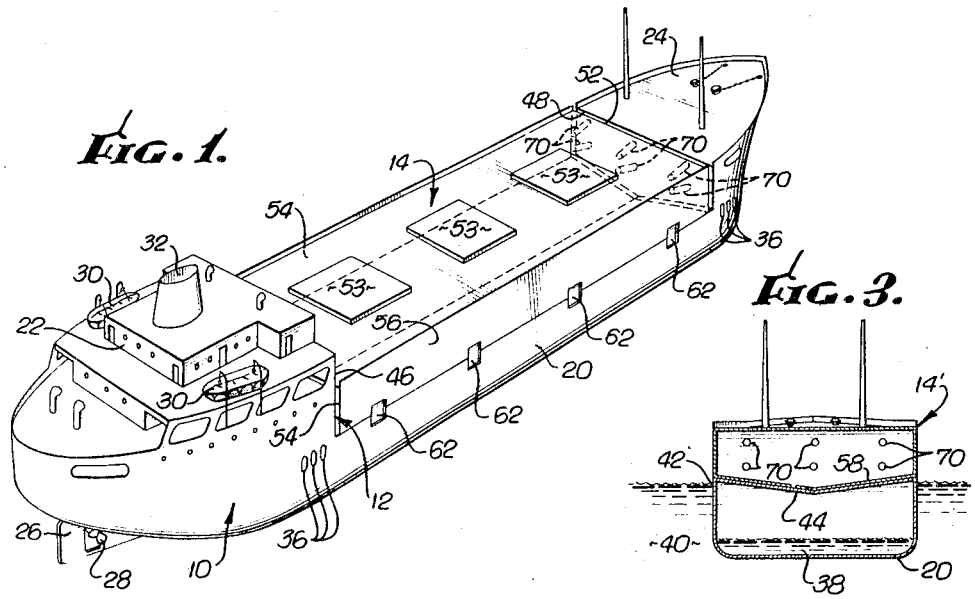
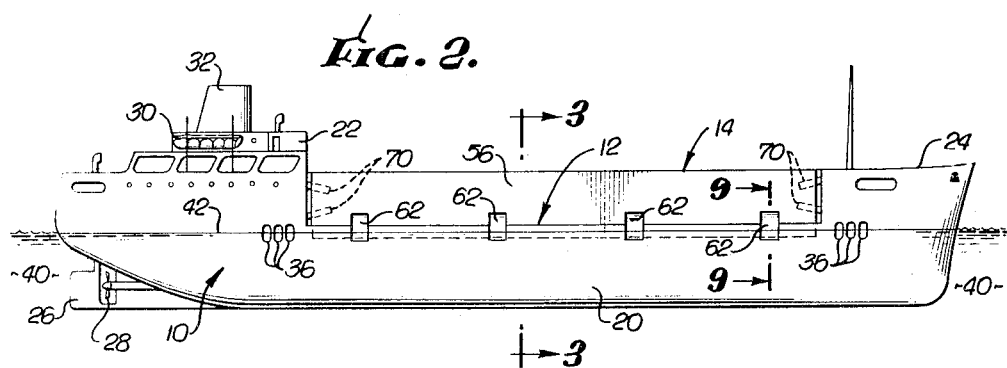
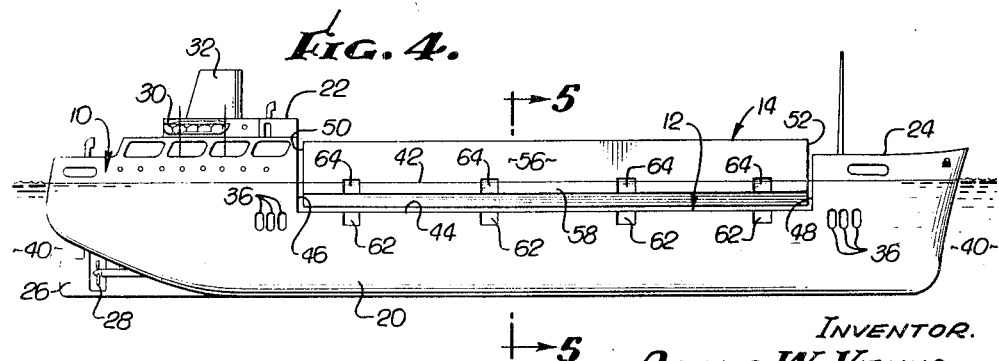
INVENTOR.
ARTHUR W. VIENNA
By Huebner & Worrel
ATTORNEYS.

April 28, 1970  A. W. VIENNA  3,508,514
CARGO SHIPS
Original Filed April 4, 1966  5 Sheets-Sheet 2
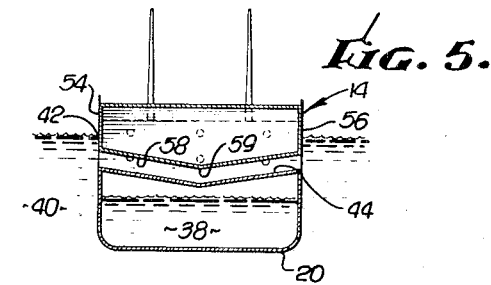
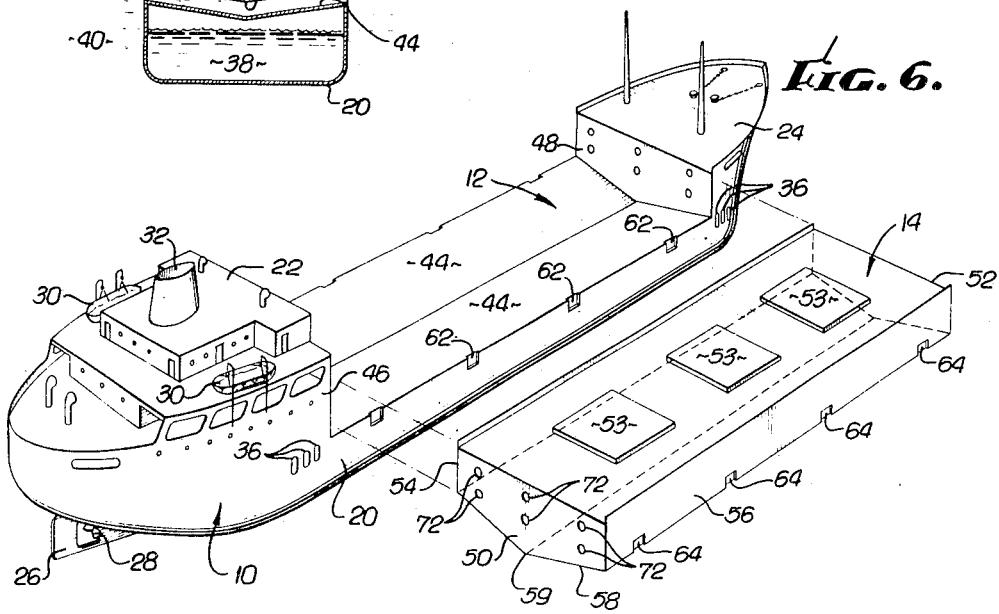
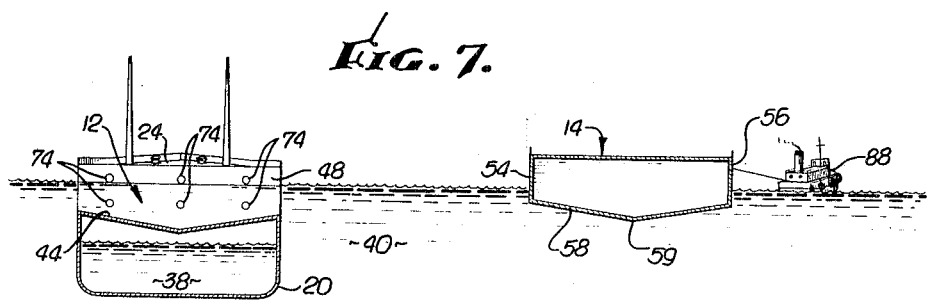
INVENTOR.
ARTHUR W. VIENNA
By Huebner & Worrel
ATTORNEYS.

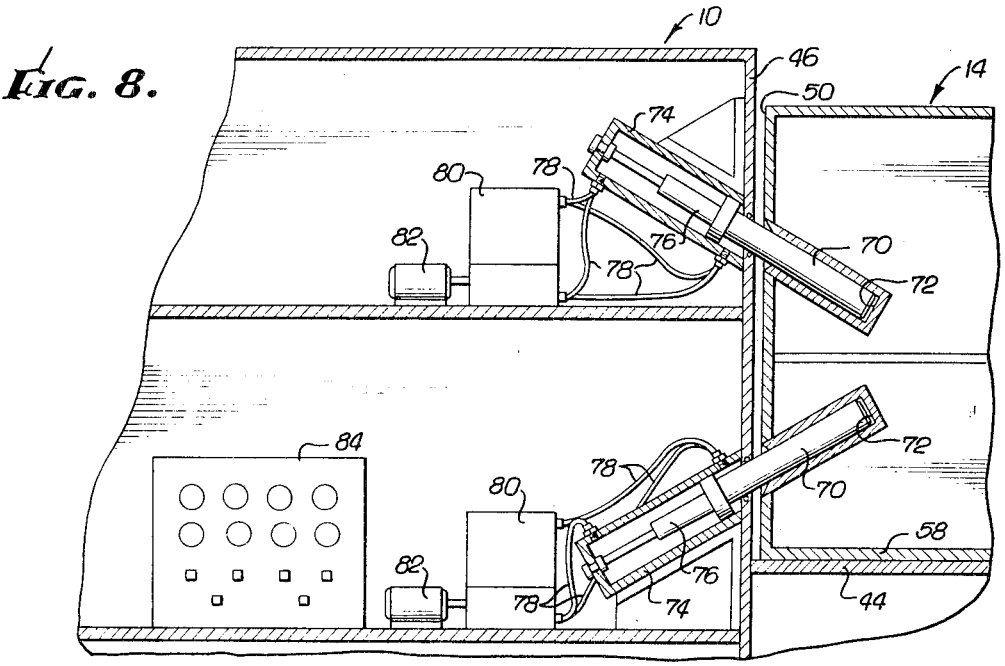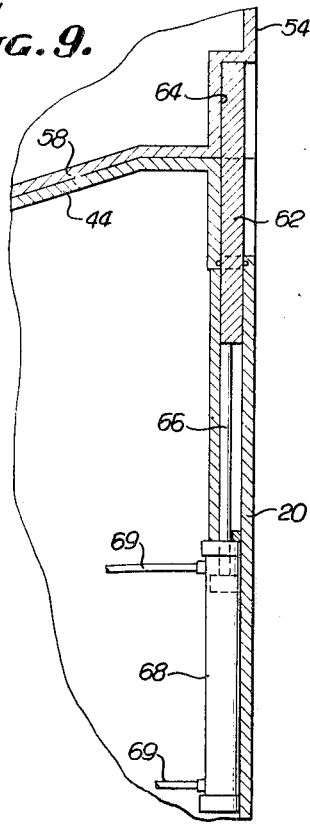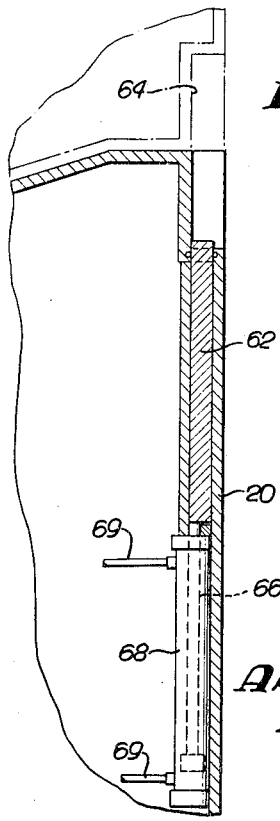

April 28, 1970   A. W. VIENNA   3,508,514
CARGO SHIPS

Original Filed April 4, 1966   5 Sheets-Sheet 4

INVENTOR.
ARTHUR W. VIENNA
By Huebner & Worrel
ATTORNEYS.

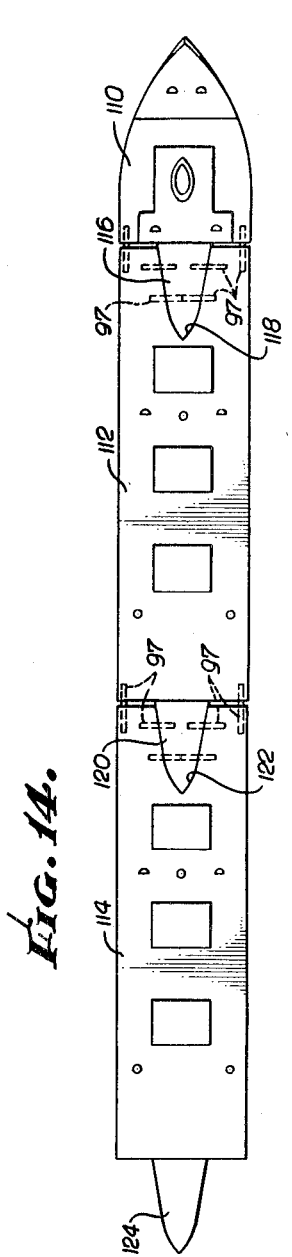
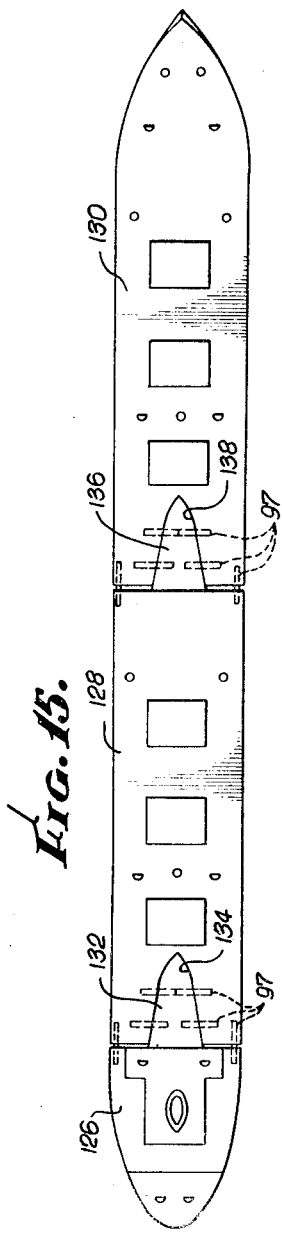
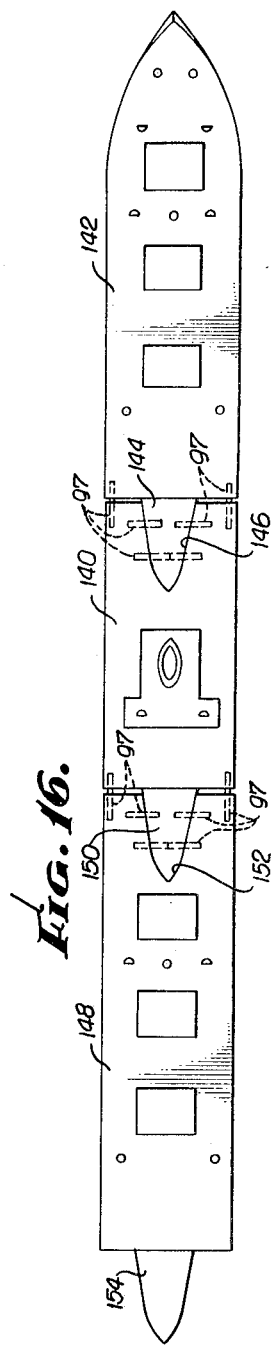
INVENTOR.
ARTHUR W. VIENNA
By Huebner & Worrel
ATTORNEYS.

United States Patent Office 3,508,514
Patented Apr. 28, 1970

3,508,514
CARGO SHIPS
Arthur William Vienna, 16519 Oldham St.,
Encino, Calif. 91316
Original application Apr. 4, 1966, Ser. No. 539,868, now Patent No. 3,417,721, dated Dec. 24, 1968. Divided and this application Aug. 5, 1968, Ser. No. 763,041
Int. Cl. B63b 3/08, 21/00
U.S. Cl. 114—235                              3 Claims

ABSTRACT OF THE DISCLOSURE

A cargo carrying ship comprised of at least two integrated sections forming a conventional vessel. The first section is a vessel containing the propulsion generating part of the ship. The second section is the cargo carrying section of the ship, and is floatably disengageable from the first section for independent movement therefrom. Thus, cargo may be loaded and unloaded from the ship by interchanging cargo carrying sections without the necessity of docking the ship for extended periods of time.

---

This is a divisional application of co-pending application Ser. No. 539,868, filed April 4, 1966, and now Patent No. 3,417,721.

This invention relates to cargo ships which are adapted to an economical and fast means for hauling, transferring, loading and unloading cargo therefrom and more particularly to a means for moving cargo wherein part of the ship is detached in the process.

Conventionally cargo ships are loaded and unloaded by docking them next to a wharf to and from which cargo is moved by cranes into and from the hold of the ship. The docking and cargo moving operation is often quite time consuming. During this time the ship is unable to make trips to other ports. Thus, its ultimate carrying capacity within any particular year is substantially reduced due to the time spent at the dock during loading and unloading operations.

In order to alleviate these and other problems affecting the achievement of a fast, efficient cargo loading and unloading operation it is a primary object of this invention to provide ships with a structure wherein the cargo can be carried in a section of the ship which can be detached and floated away separately from the ship.

A further object of this invention is to provide a ship with a detachable cargo section with means for quickly disengaging the cargo section when the ship is to be unloaded and for securely engaging it to the ship when the cargo is to be loaded.

Other objects and advantages will appear from the following description and drawings wherein:

FIGURE 1 is a perspective view of a ship having a detachable cargo section in accordance with this invention;

FIGURE 2 is a side elevational view of the ship in FIGURE 1 riding high in the sea with a minimal water ballast;

FIGURE 3 is a sectional view taken through 3—3 in FIGURE 2;

FIGURE 4 is a side elevational view of the ship as in FIGURE 2, but with a heavy water ballast so that it rides low in the sea with a relatively high waterline;

FIGURE 5 is a sectional view taken through 5—5 in FIGURE 4;

FIGURE 6 is a perspective view of a ship in accordance with this invention wherein a floating cargo section is disengaged therefrom;

FIGURE 7 is a sectional view of a ship as in FIGURE 6 showing the disengaged floating cargo section being towed away by a tug boat;

FIGURE 8 is a sectional view of a pair of locking rams used to secure the ends of a floating cargo section to a ship;

FIGURE 9 is a sectional view taken through 9—9 in FIGURE 2 showing a locking plate in locked position as it is used to secure the sides of a floating cargo section to a ship;

FIGURE 10 is a sectional view of a locking plate as in FIGURE 9 which is in unlocked position;

FIGURES 14, 15 and 16 are, respectively, top plan views of other modifications of cargo ships in accordance with this invention wherein FIGURE 14 is a three-section bow-powered ship, FIGURE 15 is a three-section stern-powered ship and FIGURE 16 is a three-section amidships-powered ship.

Figure 11:
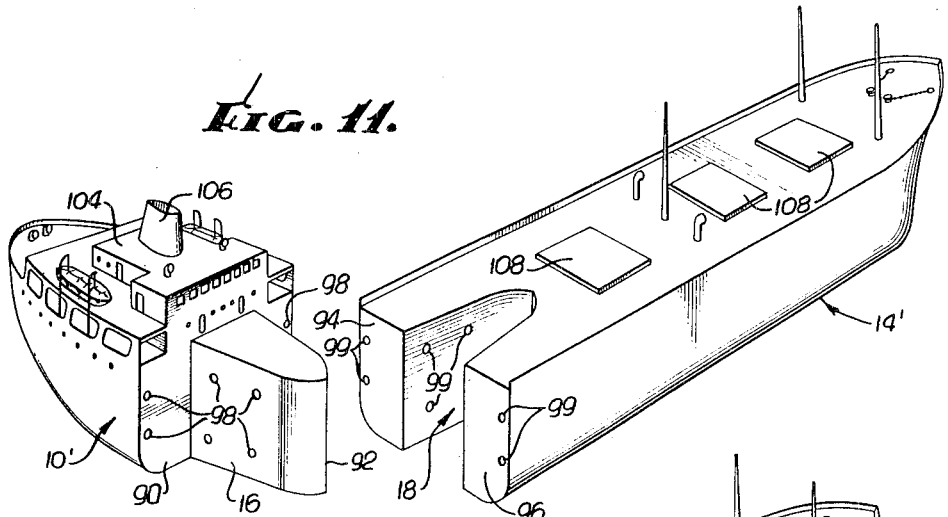
FIGURE 11 is a perspective view of another embodiment of this invention wherein the floating cargo section is detached from the remainder of the ship.

Briefly, a ship in accordance with this invention has a separate section for carrying cargo which can be detached from the main vessel. Each part of the ship is sealed so that it floats separately. Therefore, the cargo carrying section, when detached from the main vessel, can be independently towed away for loading and an interchangeable loaded cargo section can be immediately attached to the main vessel. The ship can then leave for its next port-of-call without waiting for its previously carried cargo to be unloaded, and also due to the construction of the vessel it is not necessary to dock, but can be loaded and unloaded in open sea or harbor if desired.

In the embodiment of this invention shown in FIGURES 1 through 7 the main vessel 10 includes a centrally positioned cut-out portion cargo barge recess 12 best seen in FIGURE 6, which is adapted to provide a snug fitting cradle for cargo barge 14, the floating cargo carrying section. On the other hand in the embodiment shown in FIGURES 11, 12 and 13 the ship is built in two major longitudinal sections which can each float separately and can be disengaged from one another. Here the main vessel 10' is the aft one-third of the ship and the cargo carrying section 14' is the remaining forward part of the ship. A large forward protruding wedge member 16 extends from main vessel 10' and matingly fits within a wedge shaped recess 18 in the rear of cargo carrying section 14' when the two sections are joined together. Other modifications are shown in FIGURES 14, 15 and 16.

In the ship or vessel shown in FIGURES 1 through 7 main vessel 10 is a generally conventional cargo carrying type structure having a hull 20 which supports a raised stern superstructure 22 and a raised bow or forward deck 24. A rudder 26 and propeller 28 protrude from the aft bottom of hull 20 and lifeboats 30 and stack 32 are supported on stern superstructure 22.

Positioned both fore and aft on the sides of hull 20 are a plurality of ballast ports 36 through which controlled amounts of water 38 can enter the interior of hull 20 to serve as a water ballast. Thus, normally the ship would ride high in the sea 40 with a low waterline 42 as shown in FIGURES 3 and 4. However, by opening ballast ports 36 ballast water 38 can be let into hull 20 so that the ship rides low in sea 40 and has a high-water-line 42 as shown in FIGURES 4, 5 and 7. Suitable pumps (not shown) are used to remove ballast water 38 from within hull 20. While the ballast ports 36 are shown fore and aft they may be spaced along the entire hull and not depart from the spirit of the invention.

The weight of the ballast water 38 which is pumped into hull 20 must be sufficient to raise the water line 42 of the ship above the wide V-shaped floor 44 of the cargo barge recess 12 enough that cargo barge 14 can be floated into and out of engagement with main vessel 10. Cargo barge recess 12 is water-tight and is defined by a vertical rear wall 46 adjacent the front of stern superstructure 22 and a vertical forward wall 48 adjacent to the rear of bow or forward deck 24. Both walls 46 and 48 extend down to join floor 44.

The cargo barge recess 12 has substantially the same dimensions as cargo barge 14 with just enough clearance left between them to facilitate engagement and disengagement. That is, cargo barge 14 is just slightly shorter than the distance between walls 46 and 48, its ends 50 and 52 are vertical, its sides 54 and 56 are vertical and spaced apart the width of hull 20 so that they are aligned with each edge of floor 44 where it is joined with hull 20, and its bottom 58 slopes from the lower edge of each of its sides 54 and 56 to a center line 59 so as to have a wide V-shaped configuration conforming to floor 44. Cargo (not shown) which is to be carried by the ship is placed in holds within cargo barge 14 through cargo hatches 53.

In order to securely engage cargo barge 14 within cargo barge recess 12 and prevent lateral movement, locking plates 62 are slidably mounted in the periphery of hull 20 adjacent to the junctures of both side edges of floor 44 therewith. The locking slots 64 in the lower periphery of both sides 54 and 56 of cargo barge 14 are adjacent to the juncture of sides 54 and 56 with bottom 58. They are spaced so that matching plates 62 can be slid into them when barge 14 is cradled within barge recess 12. The slots 64 are just slightly wider than plates 62 so that a snug slidable fit is provided when engaged therein.

Each of the plates 62 is vertically movable by means of a hydraulic piston 66 secured to the plates so as the plates will be slidably engageable with a locking slot 64 in cargo barge 14. The other end of the pistons 66, in turn, is slidably mounted within a cylinder 68 which is mounted below plates 62 in the side of hull 20. Fluid is supplied to and released from cylinder 68 by conduits 69 that lead to a reservoir (not shown) in main vessel 10.

The movement of piston 66 within cylinder 68 is controlled by conventional hydraulic pumps (not shown) which vary the amount and pressure of fluid supplied to cylinder 68 through conduits 69. Thus, when a locking plate 62 is moved up it will become lodged within a locking slot 64 as in FIGURE 9 and prevent lateral movement of barge 14 when it is positioned in barge recess 12. When barge 14 is to be detached locking plates 62 are lowered so that they are dislodged from slots 64 as in FIGURE 10.

In each of the walls 44 and 46 which define the ends of barge recess 12 there are elongated cylindrical locking rams 70 which are slidably movable so that they can project out and engage mating cylindrical bores 72 in ends 50 and 52 of cargo barge 14. Locking rams 70 are slidably mounted within cylinders 74 supported within walls 46 and 48 and take the form of a piston 76 therein so that they can be moved by variations in fluid pressure that take place within cylinders 74.

Fluid is supplied to and withdrawn from cylinder 74 by lines 78 which are connected to a conventional fluid pump 80. A motor 82 controls the speed and direction of rotation of pump 80. Preferably, each of the motors 82 is controlled by a single master console 84 within the vessel so that movement of the locking rams 70 can be coordinated. It is desirable that the movement of locking plates 62 is also controlled by the master console 84 in a like manner.

Preferably locking rams 70 are positioned in vertical aligned pairs wherein the upper ram is inclined downwardly and the lower ram is inclined upwardly as best viewed in FIGURE 8. This arrangement assures a solid engagement between cargo barge 14 and main vessel 10 wherein both lateral and longitudinal movement of barge 14 is prevented. Such security of engagement is important since shifting of the cargo barge 14 in rough weather could be disastrous for the ship and its crew.

Cargo barge 14 is unlocked from main vessel 10 by lowering locking plates 62 and retracting locking rams 70 until clear from barge 14. Then when cargo is to be unloaded in accordance with this invention the ballast ports 36 in main vessel 10 are opened and ballast water 38 is allowed to enter hull 20 until the water line 42 on the ship is sufficiently high to float cargo barge 14. The cargo barge 14 can then be detached from main vessel 10 as in FIGURE 6 and hauled away by a tug boat 88 as in FIGURE 7. Another barge 14 which is loaded can then be immediately floated into engagement with main vessel 10 and locked in position by raising plates 62 and extending rams 70.

Figure 12:
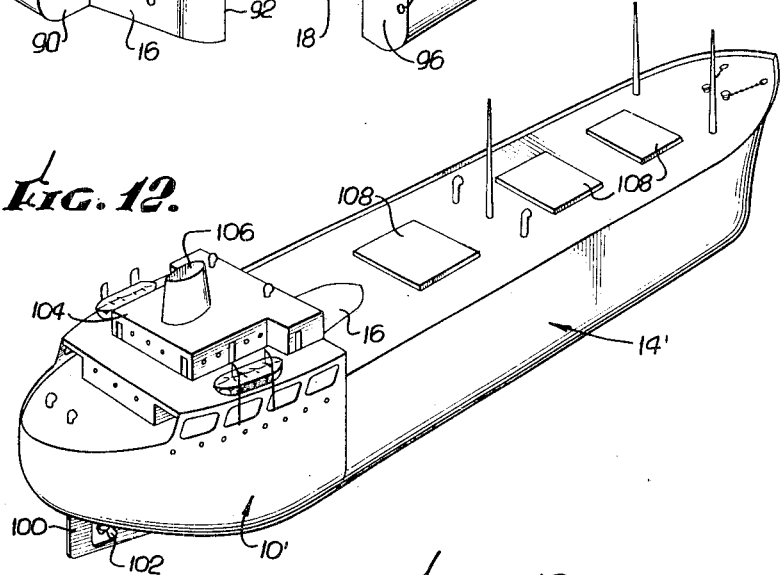
FIGURE 12 is a perspective view of a ship as in FIGURE 11 with the floating cargo section of the ship joined with the remainder of the ship.
Figure 13:
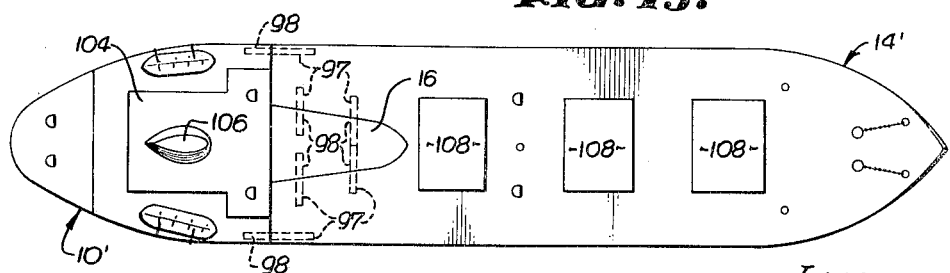
FIGURE 13 is a top plan view of the ship as shown in FIGURE 12.

The form of this invention disclosed in FIGURES 11, 12 and 13 wherein an aft main vessel 10' is separable from a forward cargo carrying section 14' has a large wedge member 16 which centrally protrudes from a vertical forward wall 90 on the front of main vessel 10' and tapers to a pointed front or bow 92. Main vessel 10' is balanced and sealed so that when separated from cargo carrying section 14' as shown in FIGURE 11 it can be maneuvered independently under its own power.

The pointed bow 92 provides main vessel 10' with the ability to move forward with at least some hydrodynamic stability and is a useful aid for guiding it into mating wedge recess 18 which is inset within the back of cargo carrying section 14' between vertical back walls 94 and 96.

When main vessel 10' and cargo carrying section 14' are united as in FIGURES 12 and 13 wedge member 16 is securely fitted within wedge recess 18 and locked in place by extending rams 97 located in cylinders 98 in forward wall 90 and the sides of wedge 16 so that they telescope into and securely engage mating bores 99 located in back walls 94 and 96 and in the sides of wedge recess 18 in cargo carrying section 14'. The construction and operation of rams 97 and bores 99 is essentially the same as shown and described relative to FIGURE 8 in the previous embodiment. This type of mating engagement and secure locking is essential for a ship that is to sail on the high seas where it is likely to run into violent stormy weather.

When the sections are united as in FIGURES 11 and 12 the ship appears conventional and has a rudder 100 and propeller 102 extending from its aft bottom, an aft superstructure 104 from which protrudes a stack 106, and forward hatch lids 108 covering the holds within forward cargo carrying section 14'.

However, when cargo is desired to be unloaded from this ship, rams 97 are retracted into main vessel 10'. It can then move independently away from cargo carrying section 14' which is sealed so that it floats when separated. Thus, main vessel 10' can be engaged with another interchangeable cargo carrying section 14' loaded with cargo and quickly sail away. Meanwhile, the cargo carrying section 14' which has been brought into the port and detached can be hauled to a suitable wharf and unloaded when desired.

As in the ship disclosed in FIGURES 11, 12 and 13 the ships in FIGURES 14, 15 and 16 are made of complementary self-contained floating sections which are engaged to each other by means of a large wedge-shaped protruding member which mates with a complementary recess in another section. And rams 97 as previously described are slidably extendtable and retractable into matching bores in the abutting adjacent complementary section of the ship.

Thus, in the form shown in FIGURE 14 propulsion is supplied to the ship by a powered main vessel 110 which is the bow of the ship and pulls identical cargo carrying sections 112 and 114. A wedge member 116 protrudes from the center of the rear wall of main vessel 110 which mates with a recess 118 in the forward wall of cargo carrying section 112. In a like manner a wedge member 120 in the rear wall of cargo carrying section 112 is engageable within a complementary recess 122 in the forward wall of cargo carrying section 114. A wedge member 124 projects from the rear of cargo carrying section 114 to provide a means for hooking on additional sections to the ship.

Another variation of this invention is shown in FIGURE 15 wherein the powered main vessel 126 is the stern of the ship and pushes an interconnected intermediate cargo carrying section 128 and bow cargo carrying section 130. Again the sections are engaged with each other by means of a forward wedge member 132 protruding from the forward wall of main vessel 126 which is received in an aft wedge recess 134 in the rear wall of cargo carrying section 128 which, in turn, is connected to bow cargo carrying section 130 by means of a forward wedge section 136 in the forward wall of cargo carrying section 130 which is received within a wedge recess 138 in the rear wall of bow cargo carrying section 130.

Illustrative of the versatility of this system is the embodiment shown in FIGURE 16 wherein the power is supplied to the ship by a main vessel 140 which is amidships. It is connected to a bow cargo carrying section 142 by receiving a rear wedge 144 of section 142 in its forward recess 146. And it is connected to an aft cargo carrying section 148, which is similar to 112 and 114, by means of a wedge section 150 protruding from its rear wall being received in a forward recess 152 in the front face of cargo carrying section 148. Another wedge section 154, which optionally can be used as another connecting link projects from the rear of cargo carrying section 148.

While the particular cargo loading and unloading from ships herein shown and described in detail is fully capable of attaining the object and providing the advantages hereinbefore mentioned, it is to be understood that it is merely illustrative of the presently preferred embodiments of the invention and that no limitations are intended to the details of construction or design herein shown.

I claim:

1. An ocean going cargo ship combination comprising: a first, independently floatable, main vessel section carrying propulsion generating and steering control mechanism, a second independently floatable cargo vessel section, the two sections being rigidly unitable to form a complete, self-propelled, cargo carrying ship having a common keel line and common deck line, said sections embodying external side configurations having portions lying in the same general plane on each side of the ship when the sections are united, one section embodying a recess, the other section embodying a portion adapted to seat in the recess, said portion and said recess extending from said common keel line to the same plane with said common deck line, means for detachably securing said first and second sections together in a rigid united relationship for combined, simultaneous movement, as a unitary vessel, said means including a plurality of retractable interlocking members extending from one section into the other section in multiple directions generally parallel with and transverse of the center keel line of said ship.

2. An ocean going cargo ship as defined in claim 1, wherein said interlocking members include elongated cylindrical locking rams in one section adapted to slidably move and project into corresponding cylindrical bores of said other section.

3. An ocean going cargo ship as defined in claim 1, wherein said portion adapted to seat in said recess is wedge-shaped and projects from said first main vessel section, imparting hydrodynamic stability to said first section when moving independently from said second section.

References Cited

UNITED STATES PATENTS

| | | | |
|---|---|---|---|
| 75,645 | 3/1868 | Raymond et al. | 114—235 |
| 1,458,134 | 6/1923 | Constan | 114—235 |
| 2,375,139 | 5/1945 | Schmitt et al. | 114—77 |
| 3,035,536 | 5/1962 | Archer | 114—77 |
| 3,345,970 | 10/1967 | De Long | 114—235 |

TRYGVE M. BLIX, Primary Examiner

U.S. Cl. X.R.

114—77